J. F. PARKER & M. VAN HEUVEL.
COLLAPSIBLE BOX OR CONTAINER.
APPLICATION FILED FEB. 2, 1917.
1,244,239.
Patented Oct. 23, 1917.
2 SHEETS—SHEET 1.
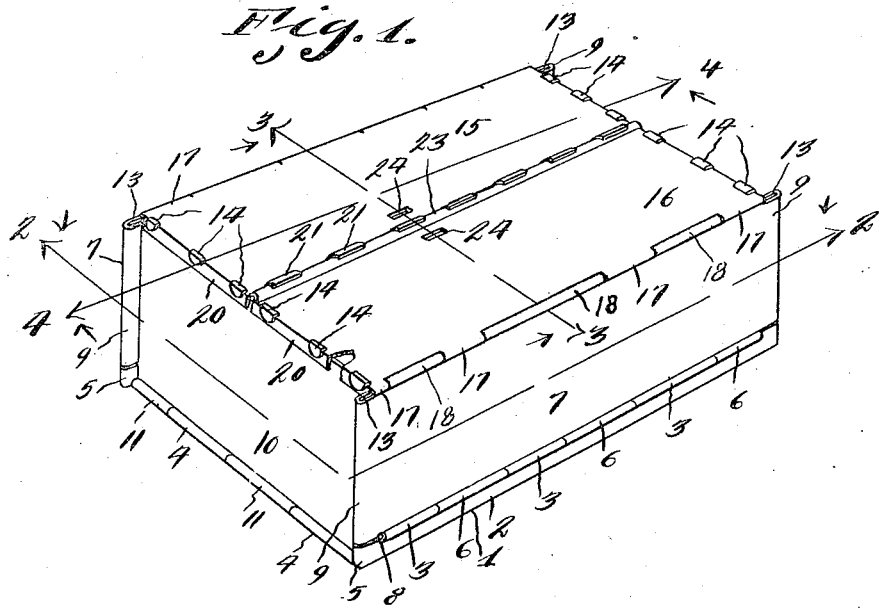
Fig. 1.
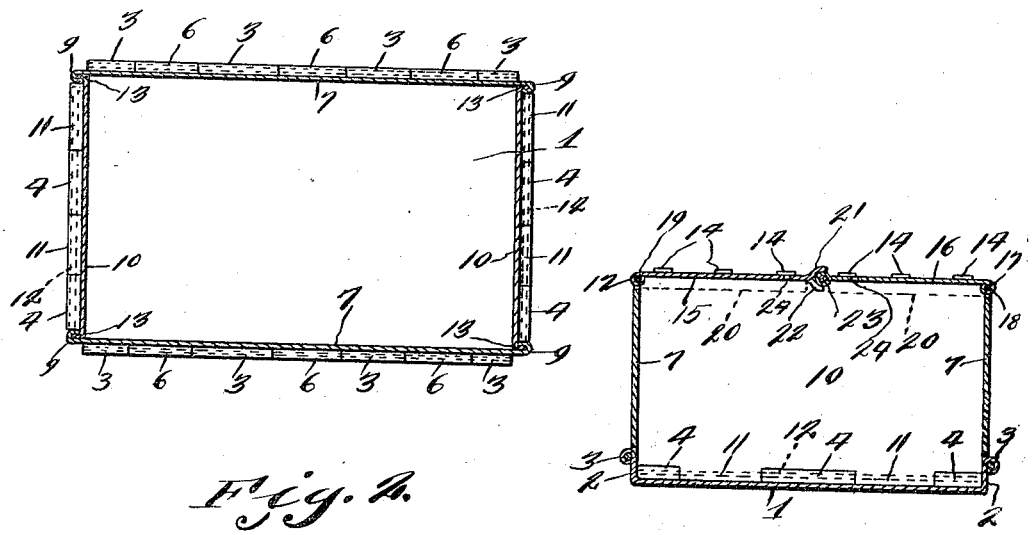
Fig. 2.
Fig. 3.
Witnesses
Inventors
J. F. Parker
M. Van Heuvel
By D. Swift & Co.
their Attorneys J. F. PARKER & M. VAN HEUVEL.
COLLAPSIBLE BOX OR CONTAINER.
APPLICATION FILED FEB. 2, 1917.
1,244,239.
Patented Oct. 23, 1917.
2 SHEETS—SHEET 2
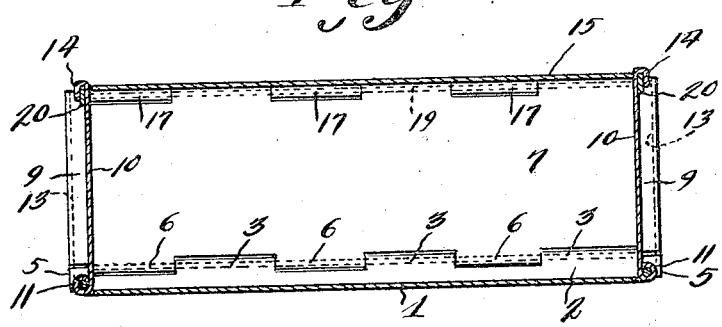
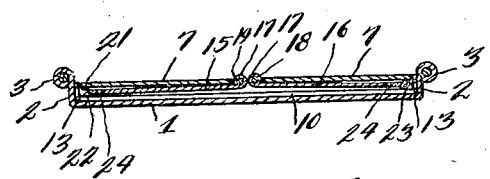
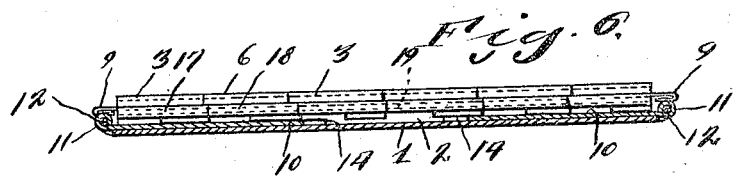
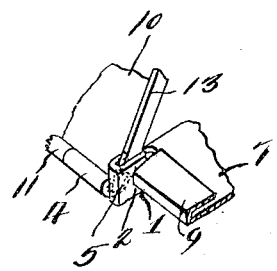

UNITED STATES PATENT OFFICE.

JOSEPH F. PARKER AND MARTIN VAN HEUVEL, OF MOBILE, ALABAMA.

COLLAPSIBLE BOX OR CONTAINER.

1,244,239.   Specification of Letters Patent.   Patented Oct. 23, 1917.

Application filed February 2, 1917. Serial No. 146,302.

*To all whom it may concern:*

Be it known that we, JOSEPH F. PARKER and MARTIN VAN HEUVEL, citizens of the United States, residing at Mobile, in the county of Mobile, State of Alabama, have invented a new and useful Collapsible Box or Container; and we do hereby declare the following to be a full, clear, and exact description of the invention, such as will enable others skilled in the art to which it appertains to make and use the same.

This invention is a collapsible box or container and is designed for the transportation of either perishable or imperishable commodities.

Its principal object is to provide a container that may be easily and quickly knocked down and folded compactly, so that it will occupy a minimum of space when being returned for re-shipping.

A further object of the invention is to provide a collapsible container with all of its component parts positively connected together, so that there may be no separable parts necessary to maintain it in its set-up position.

A still further object of the invention is to provide reinforcements for each of the several parts and means for securely holding the covers closed after the container has been filled.

The right is claimed to vary the details of construction to meet the demand of practice, provided the variations do not carry the structure beyond the limit prescribed by the appending claims.

The same numerals of reference designate the same parts throughout the several figures of the drawings, wherein: —

Figure 1 is a perspective view of the invention, showing the container set up.

Fig. 2 is a sectional view on line 2—2 of Fig. 1.

Fig. 3 is a sectional view on line 3—3 of Fig. 1.

Fig. 4 is a sectional view on line 4—4 of Fig. 1.

Fig. 5 is a transverse sectional view of the container when collapsed.

Fig. 6 is a longitudinal sectional view of the container when collapsed.

Fig. 7 is a detail perspective view of the corner formed by the junction of the bottom and end and a side.

The bottom 1 has its longitudinal edges 2 upturned, and these edges 2 have the coiled projections 3 to provide a hinge joint. The transverse edges of bottom 1 have the coiled projections 4 to similarly provide a hinge joint. At the four corners of the bottom, the upturned parts 2 are bent back on themselves so as to form the U-shaped pieces 5. The sides 7 each have the coiled projections 6 so positioned as to alternate with the coiled projections 3, and the rod 8, which passes through both the coiled projections 3 and 6, provides a means for pivotal connection between the side and the bottom. At their ends, the sides 7 are turned back on themselves to form the U-shaped members 9 similar in cross section to the U-shaped pieces 5. The ends 10 have the coiled projections 11 which alternate with the coiled projections 4 on the bottom, and the rods 12 which both the projections 11 and 4 inclose, provide the pivotal connection between the bottom 1 and the ends. The ends 10 have their vertical edges bent to form the L-shaped flanges 13, and these flanges are adapted to engage between the legs of the U-shaped members 9 and 5. At their upper edge, the ends 10 have formed, as integral parts thereof, the ears 14.

The container is covered by the covers 15 and 16, whose coiled projections 17, alternating with the coiled projections 18 of the sides 7, provide pivotal connections between the sides and covers by means of the rods 19, which are encircled by both the coiled projections 17 and 18. Both covers 16 and 15 have their ends turned down to form the flanges 20, which fall over the ends 10, when the container is set up, and the covers 15 and 16 are in position. Adjoining the flanges 20, and adapted to register with the ears 14, both the covers 15 and 16 are provided with rectangular slots through which the ears 14 pass. Where the covers 15 and 16 connect with each other, the cover 16 has its edge coiled into a cylindrical shaped edge 23 while the cover 15 is slit along its edge to form the ears 21 and 22, all the ears 21, which alternate with the ears 22, being bent to engage edge 23 on top, while the ears 22 engage edge 23 on the bottom.

The slots 24 (there being one in each of the covers 15 and 16) are designed to receive a seal or other means to secure the container against opening, when in service.

In its knocked-down position, the container has its covers 15 and 16 folded each against its respective side 7 and, the ends 10 lying down upon the bottom 1, the folded covers and sides lie upon them.

To set the container up, the sides and covers are first raised, and the sides are held in a vertical position, while the covers are turned back on the outside of them. The ends 10 are then raised and, when in a vertical position, their flanges 13 engage the sides and the bottom between the legs of the U-shaped members 9 and 5. When the container has been filled, the covers 15 and 16 are then used to inclose it, whereupon these covers are secured in their inclosing position by the ears 14, which are bent down over the depending flanges 20.

What is claimed is:—

1. A collapsible container comprising a bottom with longitudinal up-turned edges whose ends are bent back on themselves, sides pivotally connected to said up-turned edges and having their ends similarly bent-back on themselves, ends pivotally connected to the bottom and having L-shaped flanges adapted to engage the bent-back portions of said sides and said up-turned edges, covers pivotally connected to the sides and having depending flanges which adjoin the ends, the ends having ears integral therewith, the covers having slots adapted to be engaged by the ears when the container is closed.

2. A collapsible container comprising a bottom with longitudinal up-turned edges whose ends are bent back on themselves, sides pivotally connected to said up-turned edges and having their ends similarly bent back on themselves, ends pivotally connected to the bottom and having L-shaped flanges adapted to engage the bent-back portions of said sides and said up-turned edges, covers pivotally connected to the sides and having depending flanges which adjoin the ends, one cover having a cylindrically formed edge, the other cover having protruding ears on the edge, said ears being adapted alternately to contact with the bottom and top of the cylindrically formed edge, the ends having ears integral therewith, the covers having slots adapted to be engaged by the ears when the container is closed.

In testimony whereof we have signed our names to this specification in the presence of two subscribing witnesses.

JOSEPH F. PARKER.
MARTIN VAN HEUVEL.

Witnesses:
V. M. NORTHROP,
W. L. PINDER.

Copies of this patent may be obtained for five cents each, by addressing the "Commissioner of Patents, Washington, D. C."